Figure 1:
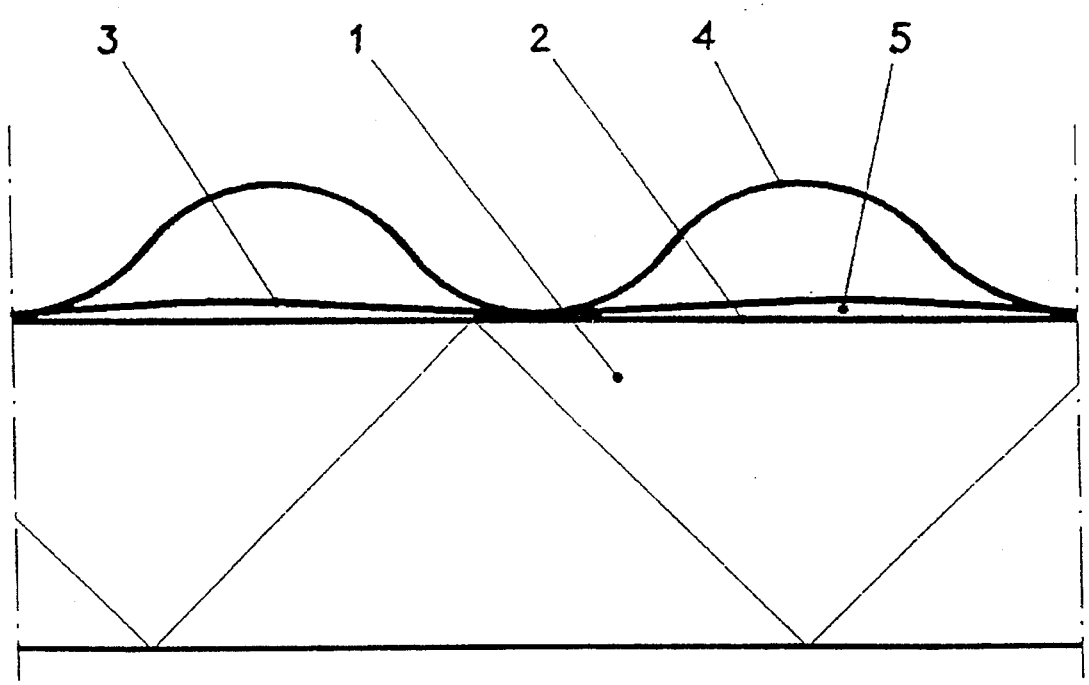
Figure 2:
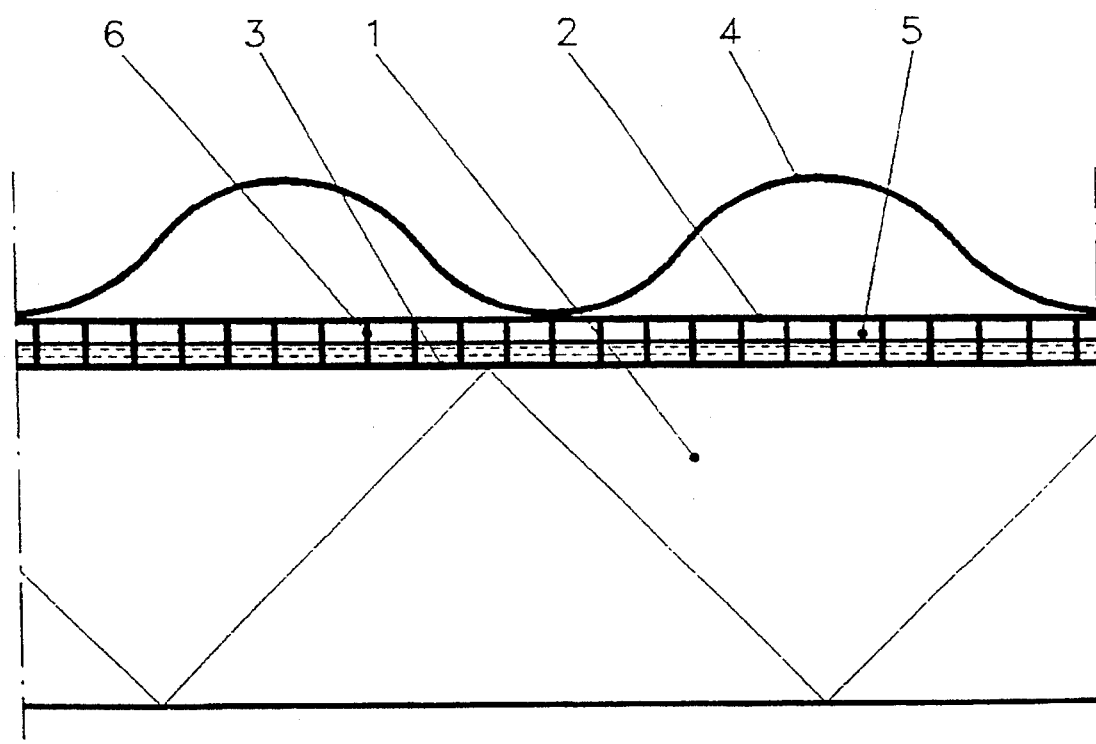
Figure 3:
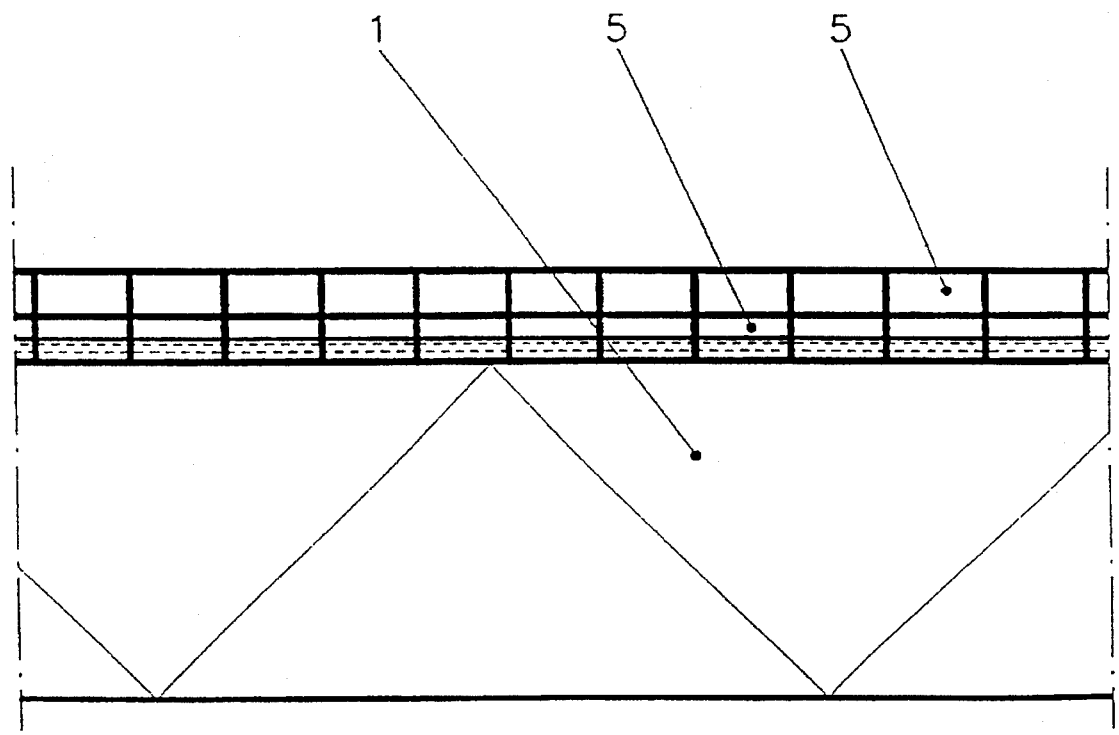

United States Patent
Reiala

[11] Patent Number: 5,645,044
[45] Date of Patent: Jul. 8, 1997

[54] SOLAR THERMAL CELL

[75] Inventor: Mauno Sakari Reiala, Hyvinkää, Finland

[73] Assignee: Sunin Ltd., Hyvinkää, Finland

[21] Appl. No.: 211,158

[22] PCT Filed: Jun. 14, 1993

[86] PCT No.: PCT/FI93/00257

§ 371 Date: Feb. 14, 1995

§ 102(e) Date: Feb. 14, 1995

[87] PCT Pub. No.: WO93/25855

PCT Pub. Date: Dec. 23, 1993

[30] Foreign Application Priority Data

| Jun. 16, 1992 | [FI] | Finland | 922793 |
| Jul. 3, 1992 | [FI] | Finland | U920449 |
| Jan. 11, 1993 | [FI] | Finland | U930005 |

[51] Int. Cl.$^6$ ............................................. F24J 2/24
[52] U.S. Cl. .......................... 126/655; 126/669; 126/709
[58] Field of Search ...................................... 126/653, 668, 126/669, 705, 648, 651, 655, 666, 667, 674, 709–713

[56] References Cited

U.S. PATENT DOCUMENTS

| 4,008,708 | 2/1977 | Hagarty | 126/668 |
| 4,055,163 | 10/1977 | Costello et al. | 126/654 |
| 4,114,597 | 9/1978 | Erb | 126/653 |
| 4,182,308 | 1/1980 | Reynolds | 126/705 |
| 4,426,999 | 1/1984 | Evans | 126/669 |

FOREIGN PATENT DOCUMENTS

| 2604684 | 8/1976 | Germany | 126/669 |
| 2611108 | 9/1977 | Germany | 126/669 |
| 3122391 | 12/1982 | Germany | 126/669 |

*Primary Examiner*—James C. Yeung
*Attorney, Agent, or Firm*—Michael de Angeli

[57] ABSTRACT

A solar thermal cell must include such a means of stopping solar radiation that no radiation is reemitted. Known art black, heat-binding absorbing surfaces are of this kind. The collecting of solar radiation energy should take place using a liquid jacket covering the entire southfacing pane of the roof, the said liquid jacket being implemented by means of a relatively inexpensive, well-sealed structure that should also be capable of withstanding strains such as that caused by snow.

Underneath solar thermal cell's intermediate spaces (5) for the heatcollecting liquid, there is a dark-surfaced mineral wool board (1) stopping solar radiation. The intermediate space (5) may be located between two light-admitting membranes (2 and 3) and overlying there may be a light-admitting sheet of corrugated fiberglass (4). Between the membranes (2 and 3) or equivalent there may be ridges (6) forming intermediate spaces (5) between the mebranes (2 and 3). The intermediate spaces (5) may be arranged in tiers; e.g. three tiers with uppermost tier being a heatinsulating air space and the lowermost tier containing a mineral wool board (1).

1 Claim, 3 Drawing Sheets

SOLAR THERMAL CELL

The invention is concerned with apparatus for collecting solar radiant energy. In particular, materials are selected and combined in a novel manner so as to obtain a high-efficiency radiant energy system at a relatively low cost. In addition to the efficient energy collecting properties, structural contributions and apparatus of the invention comprise novel features.

The amount of solar energy collected and made available for utilization by the present invention is maximized by substantially eliminating loss of solar energy reflectance from the cell; and through the use of a liquid containing jacket covering the entire radiant energy receptive surface area of each cell.

Experiments using a specific embodiment of the invention increased solar cell liquid temperature approximately 25° C. above that of a comparable metal-surfaced solar energy collector.

Experiments, using another embodiment of the invention, having corrugated fiberglass sheets, resulted in the formation of a thin, even jacket of water covering the entire surface area of the cell due to the water's surface adhesion tension and capillary force.

In another embodiment of the invention, it was found that an air layer above a layer of solar energy receptive liquid, both positioned between two membranes, improved solar energy collection.

An additional contribution results from utilization of solar thermal cells of the invention as a protective roof which can be readily and securely mounted on underlying structural timber or over an existing roof. With proper installation, neither solar liquid of the cells nor rain water seeps through fastening points or seams between cells. On top of a greenhouse, such installation prevents excessive heat and UV radiation in the greenhouse interior in the summer, and provides an insulation layer to minimize heat losses during colder seasons of the year.

Optimizing solar energy collection, maximizing the solar energy absorbed and minimizing the solar energy loss by reflectance for a given solar exposure is a primary objective of the invention. In addition, utilization of substantially the entire radiant energy receptive surface area of a solar thermal cell's exposed surface, provides for maximizing solar energy collection. Three different embodiments of the invention are described which utilize these important factors.

All of the embodiments are of a layered assembly, and common to all three is a base layer having good insulating properties and a surface, in a direction toward the solar radiation, having a dark, radiation-absorbing coloring for stopping the solar radiation. A preferred material meeting the above criteria is mineral wool board having a darkened surface, for example, by painting the surface with a flat black paint. The thermal conductivity of such material is between about 0.31 to 0.33 BTU per sq. ft. per hr. per inch thickness per degree F. at 90° F.

Such base layer material can be fastened to conventional structural underlying roofing materials, using fasteners to form a roof covering, without need for additional roof covering such as shingles; or, such base layer material can be fastened to a finished roof surface. Such material can be obtained in sheet sizes such as approximately 2 meters by 6 meters. Tongue and groove features on edges of panels of such material facilitate assembly and present a weather-tight seal when used for such roofing construction.

Such base layer insulating material is an important contribution of the invention since mineral wool board material has low heat capacity, low thermal conductivity and high radiation absorption. Such properties are due in part to the dark porous surface of the material.

Contiguous to such insulating material surface in a direction toward the solar energy source is a containment means for a solar energy receptive liquid. Such liquid, to improve its receptive properties, can be colored black.

In one embodiment, such containment means comprises two thin material sheets peripherally sealed to form an envelope for containment of such liquid. Such sheet material can be polycarbonate having a thickness dimension of between about 0.3 mm to 0.5 mm.

Contiguous to such liquid containment means, in a direction toward the solar energy source, is a cover means such as a corrugated light-admitting fiberglass sheet having a corrugation depth of about 60 mm to 80 mm.

Such cover means and, additionally, the liquid containment means and the insulation means, when secured with fasteners to a roof structure, provides for roofing protection, in addition to solar energy collection.

Such corrugated sheets having contact with the liquid containment means at the periodic corrugations, applies a force to the liquid filled containment means to form shallow channels of liquid. Such formed shallow channels, in combination with surface adhesion tension and capillary force of the liquid, result in such liquid being substantially evenly distributed over the entire cell surface area. Such even distribution provides for more efficient operation of the cell.

In a second embodiment, the liquid containment means comprises an integrally-extruded structure of two parallel sheets having periodic ridges perpendicular to such sheets to form liquid-tight channels. Such extrusion is of a material such as polycarbonate, and such sheets and ridges have a material thickness of between about 0.3 mm to 0.5 mm. The total thickness of such structure from one outside sheet surface to the second outside sheet surface is between about 5 mm to 7 mm. Improvement in solar energy collection is realized when a layer of air is present above the liquid in each channel of the cell.

Contiguous to such liquid containment means, in a direction toward the solar energy source, is a light-admitting fiberglass sheet similar to the fiberglass sheet previously described. Such corrugated sheet does not compress the extruded structure because of the strength of ridges perpendicular to the sheet surface.

In a third embodiment, an integrally-extruded structure comprising three parallel sheets are spaced and supported by periodic ridges which are perpendicular to such sheet surfaces. Such extrusion provides liquid-tight and air-tight channels for containment of such fluids. A layer of channels contiguous to the base layer provides containment for the solar energy absorbing liquid. A layer of channels contiguous to such liquid-containing channels, in a direction toward the solar energy source, contains insulating air. The parallel sheets are spaced, in a direction perpendicular to their surface a distance of between about 5 mm and 7 mm for each layer.

Modifications from those set forth in describing the embodiments are available without departing from the inventive concept. Therefore, the scope of the invention is to be determined from the appended claim.

We claim:

1. A solar thermal cell positioned for stopping and absorbing solar radiant energy from a solar energy source, comprising:

a light-admitting cover layer;

a light-admitting liquid containment layer in contiguous relationship with a surface of such cover layer which is opposite of direction of entry of energy from such solar energy source, and an insulating layer in contiguous relationship with such liquid containment layer at a location opposite of direction of entry of energy from such solar energy source into such containment layer, such insulating layer consisting of mineral wool board presenting a dark porous surface layer, such surface layer being contiguous to such liquid containment layer for stopping such solar radiant energy.

* * * * *